Figure 1:
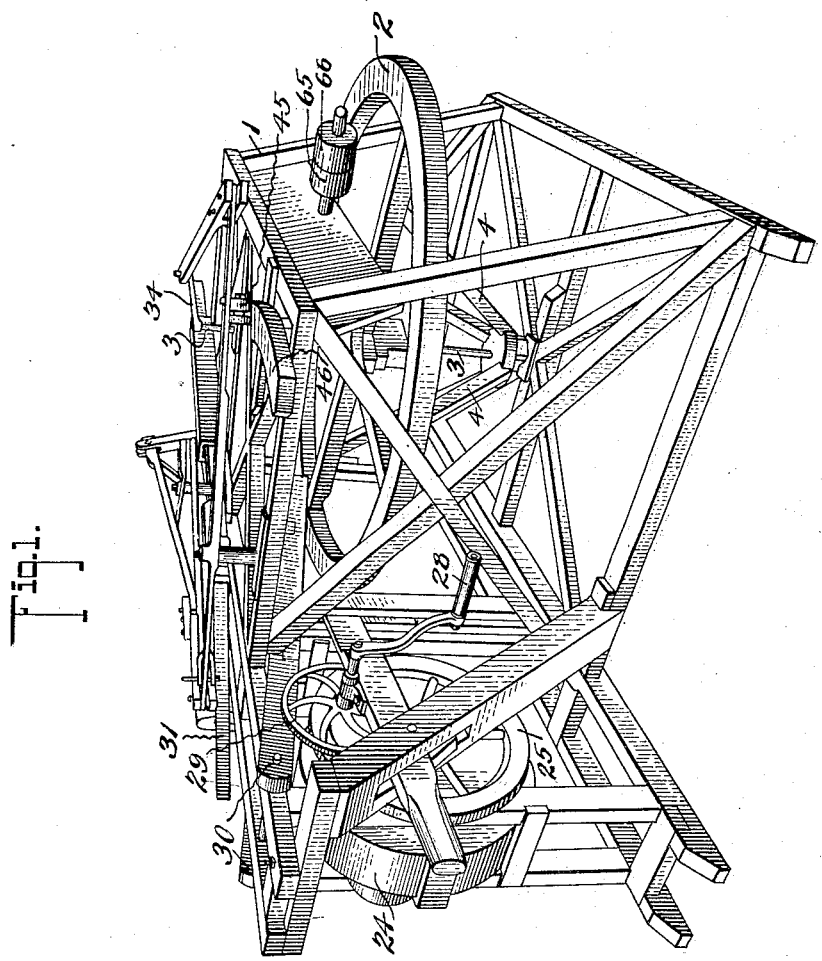

G. ANDERSON.
POWER DISTRIBUTING MECHANISM.
APPLICATION FILED JULY 30, 1914.

1,195,895.

Patented Aug. 22, 1916.
3 SHEETS—SHEET 1.

Witnesses
C. H. Wagner,
D. R. Paitello.

Inventor
G. Anderson
By Robb & Robb
Attorneys

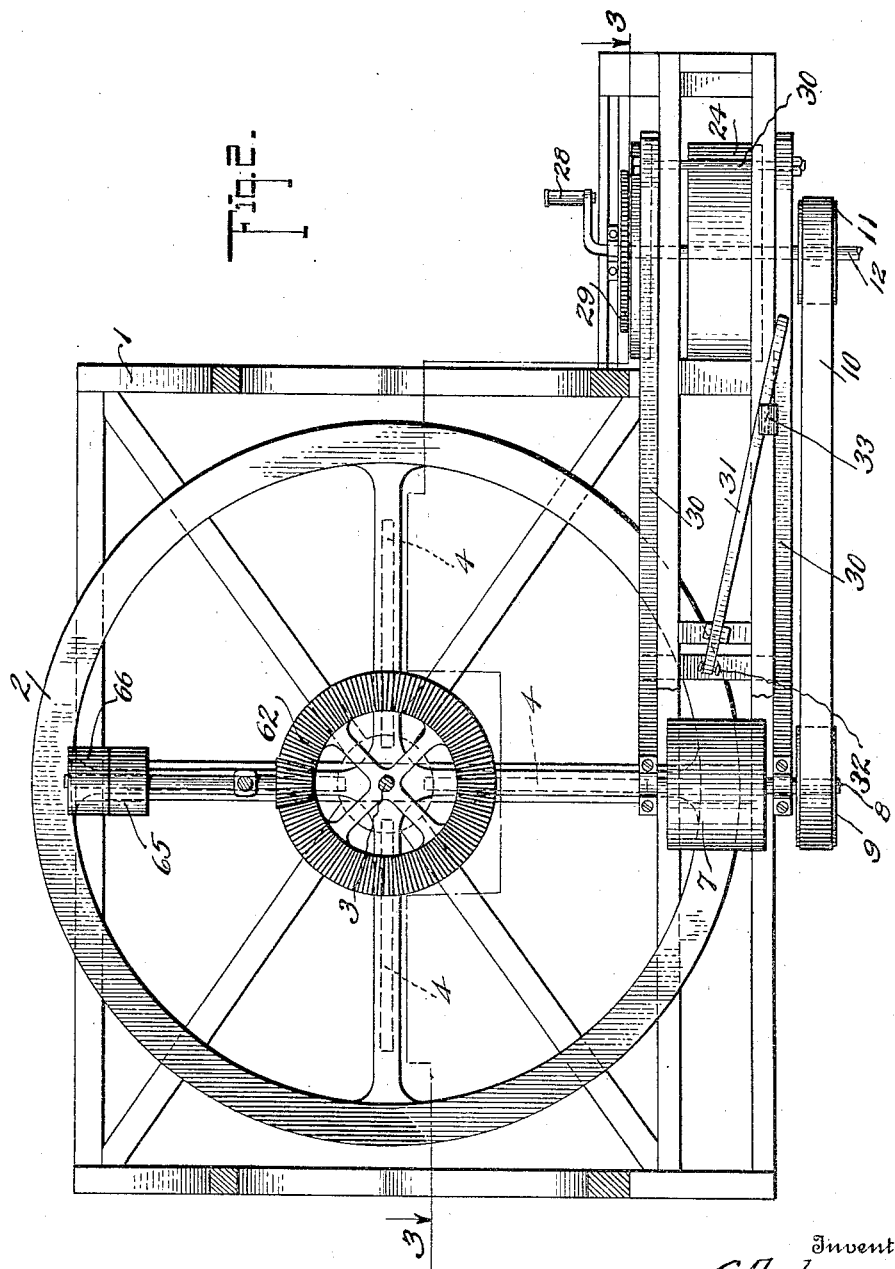

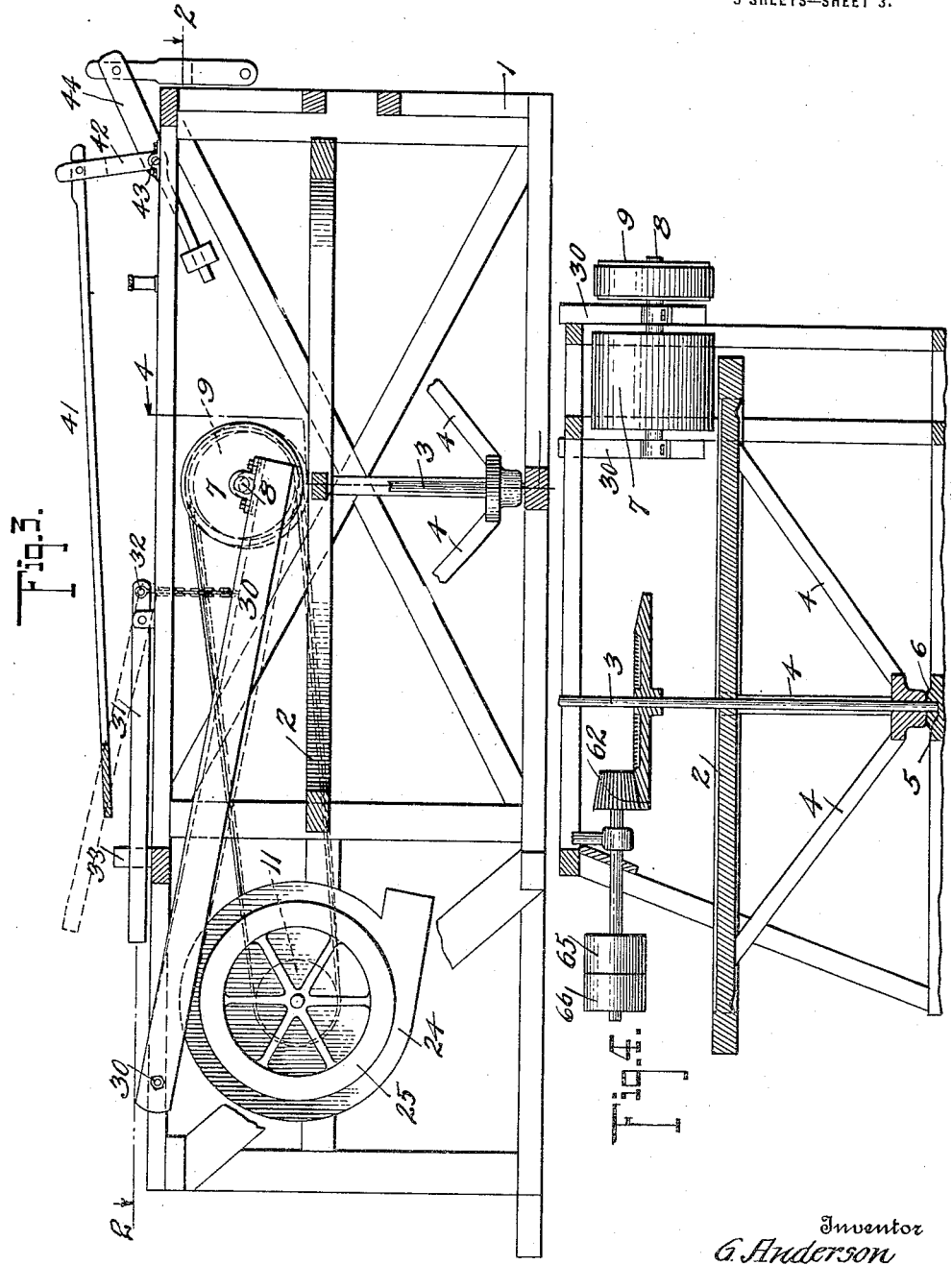

UNITED STATES PATENT OFFICE.

GUST ANDERSON, OF CALDWELL, IDAHO.

POWER-DISTRIBUTING MECHANISM.

1,195,895. Specification of Letters Patent. Patented Aug. 22, 1916.

Original application filed December 3, 1913, Serial No. 804,273. Divided and this application filed July 30, 1914. Serial No. 854,193.

*To all whom it may concern:*

Be it known that I, GUST ANDERSON, a citizen of the United States, residing at Caldwell, in the county of Canyon and State of Idaho, have invented certain new and useful Improvements in Power-Distributing Mechanism, of which the following is a specification.

This invention relates to improvements in power transmission mechanism and has for its object the effective distribution of power from a prime mover to points of utilization for the manifestation of the maximum energy of the prime mover at the points of distribution.

It is contemplated in carrying out the invention to provide in combination with a prime mover and a main power distributing wheel, means for taking the power from said wheel for utilization, subject to control by the operator at will.

The invention comprises certain other novel constructions, combinations and arrangement of parts as will be hereinafter fully described and claimed.

In the accompanying drawings:—Figure 1 is a perspective view of an apparatus embodying the features of the present invention. Fig. 2 is a horizontal section taken approximately on the plane indicated by line 2—2 of Fig. 3. Fig. 3 is a longitudinal, vertical section taken approximately on the plane indicated by the line 3—3 of Fig. 2. Fig. 4 is a transverse vertical section taken approximately on the plane indicated by the line 4—4 of Fig. 3.

This application is a division of my present application Serial Number 804,273, filed December 3, 1913, and reference is had thereto for details not claimed herein.

Referring to the drawings by numerals, 1 indicates a framework designed with parts disposed for affording support relative to the disposition and location of the various moving parts of the machine. Arranged within the framework 1 is the main power distributing wheel 2 which is disposed to rotate horizontally about a vertical axis and is fixed to a shaft 3. The wheel 2 may be constructed in various ways but is preferably sustained by downwardly converging braces 4 having their upper ends engaging the spokes of the wheel and their lower ends fixed to the lower end portions of shaft 3, the lower end of said shaft 3 being retained by a boxing 6 sustained by a portion of the framework 1.

The upper face of the peripheral portion of the wheel 2 is preferably provided with a rubber blanket or other effective friction surface, and the said surface is engaged by a driving wheel 7 disposed to rotate in a vertical plane and fixed to a shaft 8. The shaft 8 is journaled in a radius frame 30 and at its outer portion carries a pulley 9 which is connected by belting 10 with a pulley 11, the latter pulley being fixed on a driving shaft 12.

The radius frame 30 consists merely of a pair of parallel bars rigidly connected by a pair of cross bars, the parallel bars having their upper or forward ends pivotally connected to a portion of framework 1 adjacent and above the pelton wheel 24 so that the lower end of the radius frame which carries the shaft 8 is free to be lifted by swinging the frame on its pivotal connection, and when so lifted the wheel 7 is raised out of contact with wheel 2 and of course discontinues the distribution of power thereto. An operating lever 31 is pivoted to the framework 1 and has the short end of the lever connected by a chain 32 with the lower or rear end of the radius frame 30, the forward end of the lever 31 being provided with an operating handle and being adapted to be grasped manually for raising and lowering the frame 30. A hook or other suitable detent 33 is fixed to the framework 1 in position to overhang the lever 31 when it is desired to maintain the driving wheel 7 in its raised or inoperative position for some considerable time.

The upper portion of shaft 3 connects with a crank which in turn is adapted to deliver power throughout a series of links and levers, as fully set forth in the above identified parent application.

In operation, power is preferably delivered from a water wheel or other source, not illustrated, to the shaft 12, from thence to belt 10 to shaft 8. Wheel 7 is thus driven and in turn drives wheel 2 which transmits its power to shaft 3. When it is desired to discontinue the delivery of power without interrupting the prime mover, the lever 31 has its outer end portion depressed and placed beneath the bracket or hook 33, thus lifting the free end of the radius frame 30 and moving wheel 7 out of contact with wheel 2 as indicated in full lines in Fig. 3. To restore the parts to operative position it is only necessary to release the lever 31 and allow the wheel 7 to be lowered to the dotted line position, indicated in Fig. 3, in engagement with wheel 2.

The pelton wheel 24 is employed for use when the apparatus is used on the land and is not supplied with power from a power wheel. The jet of water employed for actuating the pelton wheel 24 may be supplied from any appropriate source not illustrated.

Obviously power may be distributed from the shaft 3 in any other manner desired, as for instance, the shaft is preferably supplied with a beveled gear wheel 62 meshing with a mitered pinion 63 which latter is fixed to a shaft 64 journaled in brackets in frame 1. The shaft 64 carries the usual tight pulley 65 and loose pulley 66 for being engaged by a belt for delivery of power as desired.

Having thus described the invention, what is claimed as new is:—

1. In mechanism of the class described, the combination of a framework; a main power distributing wheel sustained therein; actuating means therefor including a driving shaft mounted on the frame, a radius frame pivotally mounted at one end on the frame and having its free end extending over the main power distributing wheel, and a driving wheel journaled on the free end of said radius frame and operatively connected to the driving shaft aforesaid; and means connected to the free end of the radius frame for shifting the driving wheel to and from a position in engagement with the main power distributing wheel.

2. In mechanism of the class described, the combination with a framework; a main power distributing wheel sustained therein, actuating means therefor including a driving shaft, a radius frame pivotally engaging the framework, and a driving wheel sustained by said radius frame and operatively connected with the driving shaft; means for moving the frame to thereby shift the driving wheel to and from the power distributing wheel consisting of a lever fulcrumed on the framework and operatively connected at one end to the free end of the radius frame; and means engageable by the lever for holding the driving wheel in its disengaged position.

In testimony whereof I affix my signature in presence of two witnesses.

GUST ANDERSON.

Witnesses:
 BERT LAPTAR,
 DAVID F. GRAHAM.